United States Patent
McCarthy et al.

(10) Patent No.: US 7,053,303 B2
(45) Date of Patent: May 30, 2006

(54) SECURE CONDUIT (PATHWAY) SYSTEM FOR TELECOMMUNICATIONS AND COMMUNICATIONS TRANSMISSION EQUIPMENT, ENVIRONMENTAL ANALYSIS EQUIPMENT, COMPUTER EQUIPMENT AND THE LIKE

(75) Inventors: Craig McCarthy, San Diego, CA (US); Stanley Dunaway, San Diego, CA (US); G. Bradford Saunders, San Diego, CA (US)

(73) Assignee: Secured Systems Licensing, LLC, Carlsbad, CA (US)

( * ) Notice: Subject to any disclaimer, the term of this patent is extended or adjusted under 35 U.S.C. 154(b) by 224 days.

(21) Appl. No.: 10/690,272

(22) Filed: Oct. 21, 2003

(65) Prior Publication Data

US 2005/0000584 A1   Jan. 6, 2005

Related U.S. Application Data

(60) Provisional application No. 60/480,726, filed on Jun. 23, 2003.

(51) Int. Cl.
*H02G 3/04* (2006.01)

(52) U.S. Cl. .................. 174/68.3; 174/68.1; 174/72 R; 138/158; 52/220.7

(58) Field of Classification Search .................. 174/48, 174/49, 68.1, 68.3, 95, 99 R, 135, 72 A, 174/72 R, 72 C, 98; 220/3.2, 3.3, 3.8, 3.7; 52/220.1, 220.3, 220.7, 239; 439/207, 208, 439/209, 210, 215; 138/158, 155
See application file for complete search history.

(56) References Cited

U.S. PATENT DOCUMENTS

| | | | |
|---|---|---|---|
| 2,956,587 A * | 10/1960 | Fisher ........................ 174/68.3 |
| 3,091,657 A | 5/1963 | Stuessel ........................ 174/68 |
| 3,312,251 A * | 4/1967 | Marks et al. ............... 174/68.3 |
| 3,338,599 A * | 8/1967 | Hallman ..................... 174/68.3 |
| 4,077,434 A * | 3/1978 | Sieckert et al. ............ 174/68.3 |
| 4,398,564 A * | 8/1983 | Young et al. ............... 174/68.3 |
| 5,024,251 A * | 6/1991 | Chapman .................... 174/68.3 |
| 5,435,606 A * | 7/1995 | Navazo ....................... 174/68.3 |
| 5,831,211 A | 11/1998 | Gartung et al. ............... 174/48 |
| 6,143,984 A * | 11/2000 | Auteri ........................ 174/68.3 |

(Continued)

OTHER PUBLICATIONS

"Protective Distribution Systems (PDS)," *National Security Telecommunications and Information Systems Security* (*NSTISS*), No. 7003, pp. 1-13 (Dec. 13, 1996).

(Continued)

*Primary Examiner*—Angel R. Estrada
(74) *Attorney, Agent, or Firm*—Ladas & Parry LLP (57) ABSTRACT

A secure conduit system is described through which electrical, electronic or optical fiber cables, pneumatic tubing, hydraulic tubing or other elongated wiring, cabling or tubing can be routed. The system includes open-sided raceways through which the cable is routed, covers for closure of the raceways, at least one locking device to lock a raceway and cover and being releasable only from within the raceway, with the device release being accessible only though an open end of the conduit, and the remainder of the conduit sections being openable only after release of the locking device of the first section. The conduit system may be multibranched and is intended to be connected at its ends to secure enclosures which allow for controlled access to the cabling and to the release mechanism. Typical uses will be for computer networks, communication systems, equipment control systems and remote environmental gas sampling and analysis systems.

36 Claims, 9 Drawing Sheets

U.S. PATENT DOCUMENTS

| | | | |
|---|---|---|---|
| 6,150,610 A | 11/2000 | Sutton | 174/68.3 |
| 6,216,746 B1 * | 4/2001 | Guebre-Tsadik et al. | 174/68.3 |
| 6,491,535 B1 | 12/2002 | Busé | 439/215 |
| 6,693,238 B1 * | 2/2004 | Jadaud et al. | 174/48 |

OTHER PUBLICATIONS

U.S. Appl. No. 10/763,732, filed Jan. 23, 2004, McCarthy et al.

* cited by examiner

SECURE CONDUIT (PATHWAY) SYSTEM FOR TELECOMMUNICATIONS AND COMMUNICATIONS TRANSMISSION EQUIPMENT, ENVIRONMENTAL ANALYSIS EQUIPMENT, COMPUTER EQUIPMENT AND THE LIKE

CROSS-REFERENCE TO RELATED APPLICATION

This application is based upon and claims the benefit of the filing date of U.S. Provisional Patent Application Ser. No. 60/480,726, filed on Jun. 23, 2003.

BACKGROUND OF THE INVENTION

1. Field of Invention

The invention relates generally to conduits, raceways and similar devices for routing signalling or transmission apparatus such as cables, tubing and wires (including those composed of either metal or optical fiber) between locations. More particularly it relates to such devices which must be used for signalling or transmission in a highly secure environment.

2. Background Information

In many industries, research facilities and governmental and military facilities there is a need for secure routing of signaling and transmission means such as computer, power, communication and similar cables and wires and fluid conveyance tubing, e.g., gas and liquid pneumatic and hydraulic lines. (For brevity herein such signalling and transmission means will often be exemplified as and referred to collectively as "cable", "cables" or "cabling" unless the context indicates otherwise or specific types of such means are mentioned. It will be recognized, however, that such collective terminology is used for convenience only and is not intended to be limiting.) Further, the terms "conduit" and "conduit system" may be considered synonymous unless the context indicates otherwise.) Unauthorized access to such cables must be prevented or at least made extremely difficult while yet easy to detect. Conduits for routing of such cables must be protected from intrusion by penetration or removal of access covers or sections of conduit, and also must provide a suitable degree of physical protection for the transmission devices within the conduit from environmental hazards, weather and climate excesses and accident or attack. However, such protection must not be so cumbersome that authorized access for removal, repair or insertion of the cables within the conduit is made excessively difficult.

Typical uses for the present secure conduit invention will be for computer networks, communication systems, equipment control systems, remote sensing systems and the like. Specific principal uses which may be illustrated as examples are as conduits for telecommunications cables, computer cables, power transmission cables (especially for power to critical operational equipment or facilities) and environmental gas sampler tubing or piping. Users may be companies, research organizations, military units and governmental organizations and agencies. Facilities where secure conduits are desirable include office and laboratory buildings; military camps and bases; ships, dockyards or other marine facilities; airports; prisons; chemical plants and petroleum refineries; factories; banks, exchanges and other financial institutions; and power, gas and water utilities.

In the past, there have been numerous cable and other routing systems, such as those used to route computer, electric power and communications cables and wires to and within offices, especially within a building. A particularly successful example of such a system is that described and claimed in U.S. Pat. No. 5,831,211, owned by the assignee of the present invention and patent application, Holocom Networks of Carlsbad, Calif., and commercially available under the trademark TOPRUNNER®. A principal limitation of such systems, however, is that they are not secure from intrusion and cannot be made secure without extensive modification. Such modification is impractical in most cases, since the intent of their designers and their users has been to have them readily accessible to facilitate frequent reconfiguration. Therefore while such non-secure systems do provide functions similar to those of the system of the present invention, i.e., routing of cables, their physical structures and security capabilities are entirely different.

It would therefore be of significant value to have a secure conduit system which would provide security against unauthorized access to cables routed through the system, while at the same time permitting simple and easy access to those cables within the system to authorized persons.

SUMMARY OF THE INVENTION

The invention described and claimed herein is of apparatus for secure routing of signalling or transmission means which comprises an open-sided open-ended elongated channel member through which the means is routed, a cover for closure of the open side of the channel member, a locking device to lock the cover to the channel member or enclosures, the locking device being releasable only from within the channel member; and release means for releasing the locking device and accessible though an open end of the channel member, whereby the cover and the channel member, once locked together, can be separated only by release of the locking device by access through an open end of the conduit, pathway or enclosure. Normally there will be plurality of channel members aligned end-to-end, each with its own cover. For most of the channel members, the covers will be held on by simple locking tabs which engage projections or ribs within the channel members. After assembly of the latter cover/channel pairs, the remaining cover and channel member will be assembled with the locking device to secure the entire length of the conduit. The conduit preferably terminates at its ends in secure enclosures which limit access to the interior of the conduit to only that which can be gained through the enclosures. Other secure enclosures may be spaced along the length of the conduit.

T-, Y-, L- and X-shaped and other curved, bent, or multibranched raceway/cover pairs can be included in the conduit structure to form branches which allow conduit directional changes, junctions and multiple conduit routes. In such cases each conduit branch should terminate in a separate secure enclosure, and normally a cover/channel pair with a locking device will be included in each branch, unless the branch is quite short, such that it can be secured by abutting the main secured portion of the conduit.

The signalling or transmission means of significance in this invention includes, but is not limited to, computer, power, communication and similar cables and wires and fluid conveyance tubing, e.g., gas and liquid pneumatic and hydraulic lines. Within the secure conduit of this invention any one or more of such means may be routed, the number being limited primarily by the physical size of the conduit and by the sharpness of any turns in the conduit. Where a conduit has multiple branches, individual cables may follow different paths through the conduit system, such that different numbers of cables may be present in different branches of the system.

The locking device which permits securing of the cover to the conduit may be secured within the conduit in a variety of manners, such as by use of spring-urged pins engaging projecting ribs on the interior walls of the conduit or by use of bolts which allow clamping of the locking device to both the top of the conduit and to the interior ribs.

Details of the invention and further descriptions will be found below.

DETAILED DESCRIPTION AND PREFERRED EMBODIMENTS

For the purposes of this invention, the terms "secure", "secure conduit", "secure conduit system", "secure enclosure" and the like are intended to include those systems which meet the requirements of "Protective Distribution Systems (PDS)" as defined by the National Security Telecommunications and Information Systems Security ("NSTISSI") Secretariat of the National Security Agency in NSTISSI Instruction No. 7003 (13 Dec. 1996), the content of which is incorporated herein by reference. In addition to those secure conduit systems which are "secure" within the meaning of the PDS requirement, the present invention may also be used for secure conduit systems where the degree of security is not within the specific PDS standard. Such other conduit systems may include various non-governmental and/or commercial systems to which the NSTISS Instruction may not be applicable or where application is voluntary.

The invention described and claimed herein is a secure conduit system through which electrical, electronic or optical fiber cables, pneumatic tubing, hydraulic tubing or other elongated wiring, cabling or tubing can be routed. The conduit system can be connected at its various ends to secure enclosures which allow for secure controlled access to the cabling inside the conduit system. Typical uses will be for computer networks, communication systems, power transmission, equipment control systems, remote sensing systems and the like. Principal uses which may be illustrated as examples in electrical, electronic and telecommunications fields include secure routing of power cables, computer cables and communications cables for networked computer systems and wired telecommunications systems. Locations may be within, between or outside buildings. The secure conduit system will also be of importance even with wireless communications systems, such as for security of landline cabling from the generating or receiving equipment to the sending/receiving antennas.

Another example of potential users' systems is a system for remote environmental air, gas or liquid sampling and analysis. In this type of system, a fluid-tight tube, hose or pipe is run from a storage or analysis location to a remote sampling site where the pipe terminates in an open liquid-, air- or gas-sampling device. Periodically or continually samples of the environment at the sampler point are taken, and then transported back through the pipe to a collection system for analysis or directly to an analysis system. Such secured pipe is desired when the liquid, gas or air in the pipe cannot be leaked to the outside or accessed by unauthorized persons or in an unauthorized manner. Such unauthorized access is of particular concern when the liquid, gas or air being sampled is itself flammable, toxic or otherwise dangerous, or when it may be contaminated with or otherwise carry or entrain flammable, toxic or otherwise dangerous components.

It is not intended that the secure conduit itself normally be air-, liquid- or gas-tight, although its closed configuration is such that it can be exposed to inclement environments and will to some extent resist infiltration of rain, snowmelt, blown dust and similar common environmental elements. Should greater environmental protection be desired, it is contemplated that the cabling can be encased in a protective sleeve or similar device prior to being installed within the conduit, or alternatively the conduit itself, after insertion of the cables can be encased in such a protective covering. It will be recognized that reconfiguring of the conduit contents will thereafter normally necessitate removal of some or all of the protective covering.

Figure 1:
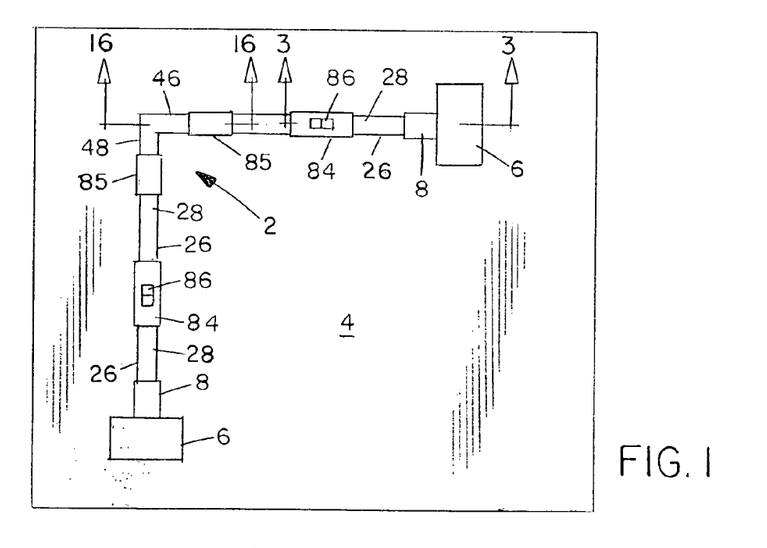
FIG. 1 is a side view of a typical conduit assembly mounted on a wall of other supporting surface.

The invention is best understood by reference to the Figures of the drawings. FIG. 1 shows the components of the secure conduit system 2 in a very simplified installation and a wall 4. Installations will commonly be mounted on walls, ceilings, space dividers, bulkheads, building structural members such as columns, rafters, studs and joists, and other similar supports. They may also span short unsupported spaces (usually not more than 3–10 ft [about 1–3 m]) such as running across spaced-apart joists or studs. The raceway may be surface mounted, but for the most security, however, and as required for PDS installations, most or all of the secure conduit will not be surface mounted, but rather will be mounted spaced apart from the surface over which it runs, so stand-offs are needed along the conduit to maintain it in position. This requirement is to insure that observers of the conduit can detect any attempts to penetrate the conduit from its back side, by being able to see any suspicious hole in the surface to which it is mounted or any suspicious device bridging the gap between the surface and the conduit. Over the length of a conduit run, different means of attachment, stand-off and support may be used at different locations.

Prior to installation, one first determines the locations of the various secure enclosures 6 needed along the secure conduit 2 and the desired route of the conduit (including branches thereof) to reach those enclosures. It is not necessary that the route selected be the shortest possible. As noted, there are a number of different uses for the secure conduit which are anticipated to result in different numbers of secure enclosures along the route, with different spacings between adjacent enclosures. Secure enclosures 6 have been produced and sold commercially by the assignee of this patent application and are also the subject of copending U.S. utility patent application Ser. No. 10/112,353, also assigned to the assignee of this application. Essentially each such secure enclosures 6 incorporates a box-like structure which houses a connection to apparatus of a secure signalling or transmission system 2 such as a computer network, communications network or environmental analysis system. To attach to or gain access to the secure system 2, a user must have a device (e.g., a computer) external to the enclosure but which can be connected to the system 2. The enclosure 6 is normally closed by a penetration-resistant door, which if desired may have a back flange to further enhance penetration resistance and which is locked by a secure lock. (Where the system is one which meets the PDS requirements, the lock itself will meet corresponding governmental requirements.) An authorized user will have a key or combination to the lock and can open the door and access a connection device on the secure system 2 apparatus within the enclosure. The user then makes the connection with his/her device and proceeds to do whatever is desired during access to the secure system. For instance, a computer user could access a secure database or give operating commands to a piece of equipment which is operated via the secure system or a chemist could take samples of the fluid passing through an environmental sampling tube. Security of the enclosure is assured since the user must keep the door open while having access, so an observer can see the user at work. Normally only a single connection is provided inside each enclosure, so only a single individual can access the system at a time through the enclosure. Further, if the user terminates his/her use of the system but does not close the enclosure after use, that also is observable since the door can be seen to be open and the identity of the user as the person who last accessed the enclosure will be known. While FIG. 1 shows secure enclosures 6 at each end of the conduit 2, it will be recognized that additional secure enclosures may be positioned at points along the length of the conduit 2, such that access may be had to intermediate sections of the contained cables. Thus, for instance, multiple computer access enclosures may be present on a single computer network cable so that multiple computer users can access the computer network, each through his or her individual access enclosure.

Figure 2:
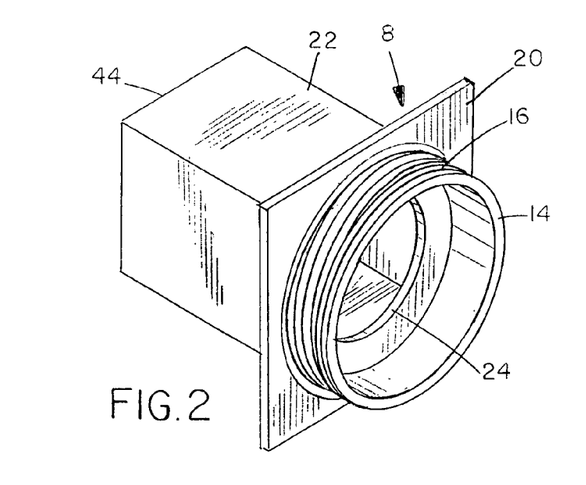
FIG. 2 is a perspective view of a flange connector.
Figure 3:
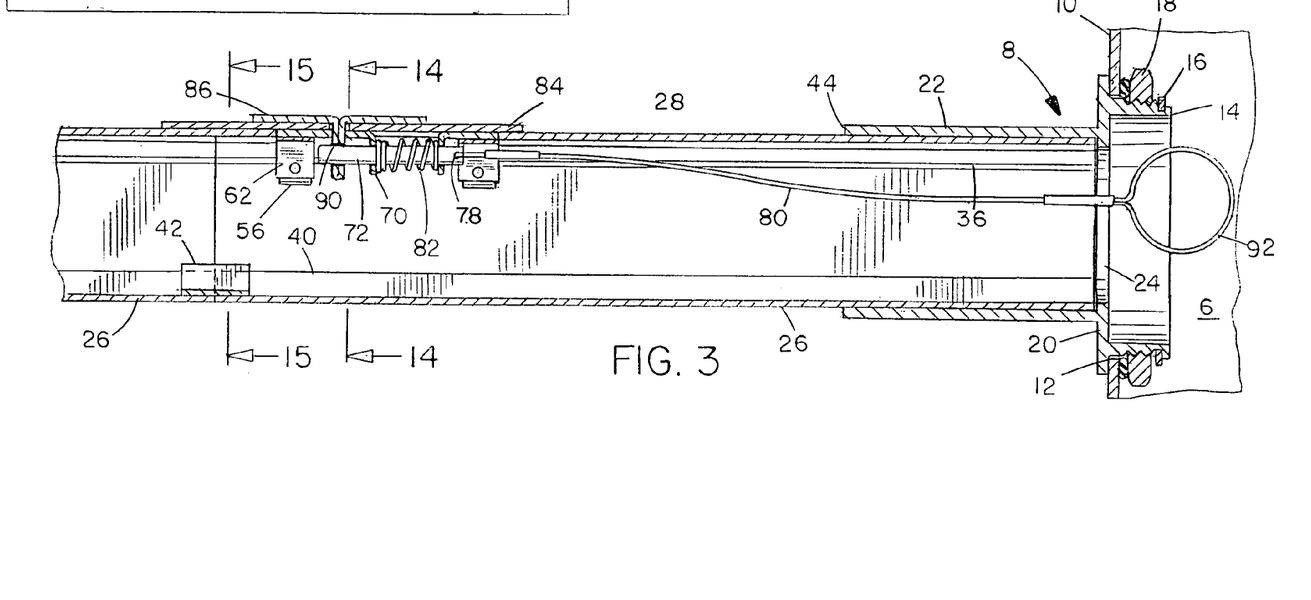
FIG. 3 is an enlarged sectional view taken on line 3—3 of FIG. 1.

The secure conduit system 2 connects to a secure enclosure 6 by means of a flange connector 8, as shown in FIGS. 2 and 3. The wall 10 of enclosure 6 has an aperture 12 (usually circular) through which the circular end extension 14 of the flange connector 8 is inserted. Extension 14 has external threads 16 which are disposed within the enclosure 6 upon insertion and the connector 8 is secured to the enclosure wall 10 by threading circular nut 18 onto threads 16 until flange 20 of connector 8 abuts the exterior side of wall 10. Extending from flange 20 is connector tube 22 which is hollow with a cross-section (usually square or rectangular) which corresponds similar to the cross-section of the raceway 26 and cover 28. An aperture 24 in flange 20 provides passage for cables from within the enclosure 6 into the connector tube 22 and thus into the conduit system.

Figures 4, 5, 6:
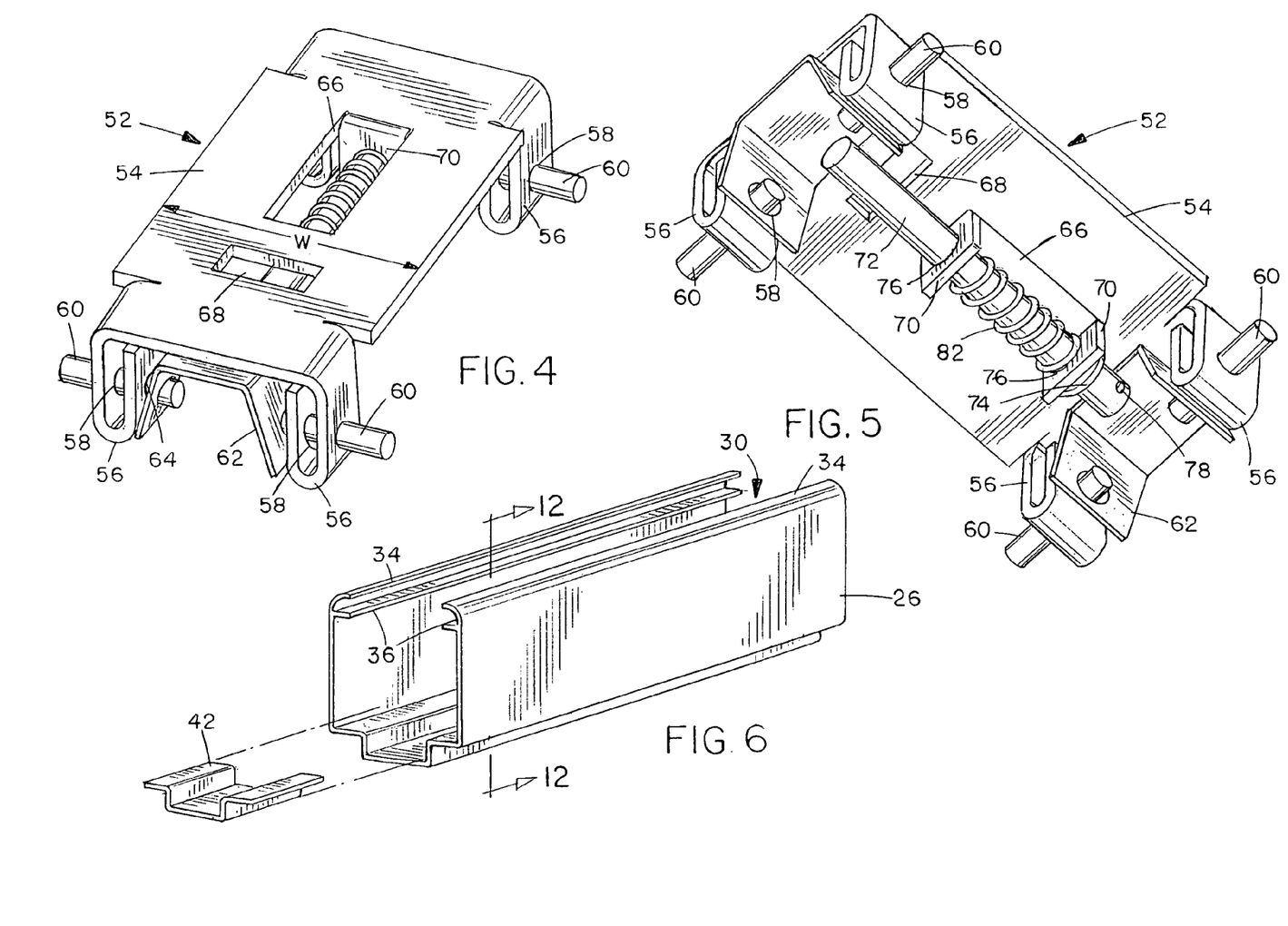
FIG. 4 is a perspective view from above of a locking unit.
FIG. 5 is a perspective view from below of the locking unit of FIG. 4.
FIG. 6 is a perspective view of a section of a raceway.
Figure 7:
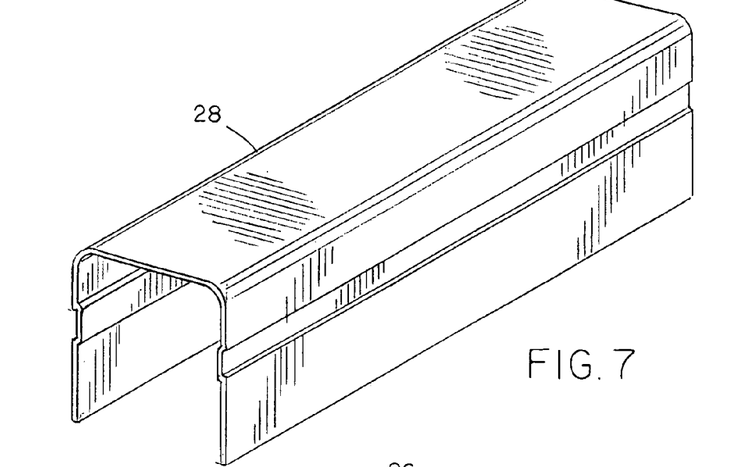
FIG. 7 is a perspective view of a section of a top cover.
Figure 31:
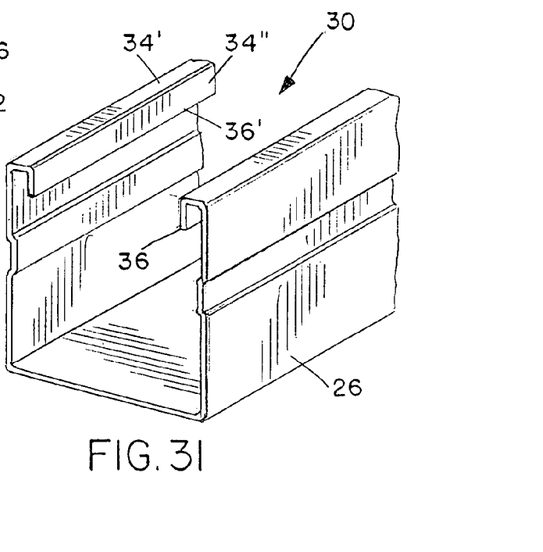
FIG. 31 is an oblique view of one end of an alternative embodiment of the raceway of FIG. 6.

A principal component of the system 2 is at least one, and usually many, raceways 26. A raceway 26 can be any convenient length. It is convenient to provide stocks of raceway 26 in several standard lengths, for example 1, 3, 6 and 12 feet (or metric counterparts of 30 cm and 1, 2 and 4 m). These can be cut to shorter lengths as needed and joined to make longer lengths. Covering the raceways over most of their length are at least one (and also usually many) top covers 28. As best shown in FIGS. 3, 6 and 31, a raceway 26 is an elongated channel member having a generally U-shaped cross-section with an open top 30 and suitable for the routing of cables, wires, tubing and the like. (For purposes of this invention the word "raceway" includes all suitable elongated channel members, regardless of whether they may be referred to by other names in specific industries.) The specific U-shaped cross-section is not critical, as long as it can securely interfit with a corresponding top cover 28. The particular U-shaped cross-section will in many cases be dependent on the type of material from which the raceway 26 (and top cover 28) is made and how it is manufactured. For instance, aluminum raceways may be formed by extrusion, which allows for the rounded configurations and internal ribs seen in the embodiments of FIGS. 3 and 6, while steel raceways commonly are formed by bending which results in more straight-sided and sharper-edged embodiments such as that shown in FIG. 31. In the embodiment of FIGS. 3 and 6, the side walls 32 curve over inwardly at the top to form protruding longitudinal flanges 34. Positioned on the interior of the raceway 26 and disposed parallel to flanges 34 are a pair of longitudinal ribs 36. In the FIG. 31 embodiment, the flanges 34 have a flattened portion 34' and an inwardly folded end portion 34", and the function of the ribs 36 is performed by the downwardly facing ends 36' of the folded end 34". The bottom of the raceway 26 is stepped as shown at 40 to accommodate a linking plate 42 which connects two raceways abutting at their ends (FIG. 3). One half of a gap bridge 42 is secured to the inside of the bottom of the raceway 26 as by adhesive bonding or spot welding, and then the other half is similarly secured to the abutting raceway 26 to form a firm connection between the two raceways. For most of the raceway elements 26, a closed top cover 28 having a complementary U-shaped cross section and no apertures (see FIG. 7) is used to close the open top 30 of the raceway 26 once the cabling has been inserted. The closed top cover 28 has secured on the inside thereof (as by spot welding) a locking tab 38, which interfits with the ribs 36 and locks the top cover 28 in place.

Figures 8, 9, 10, 11:
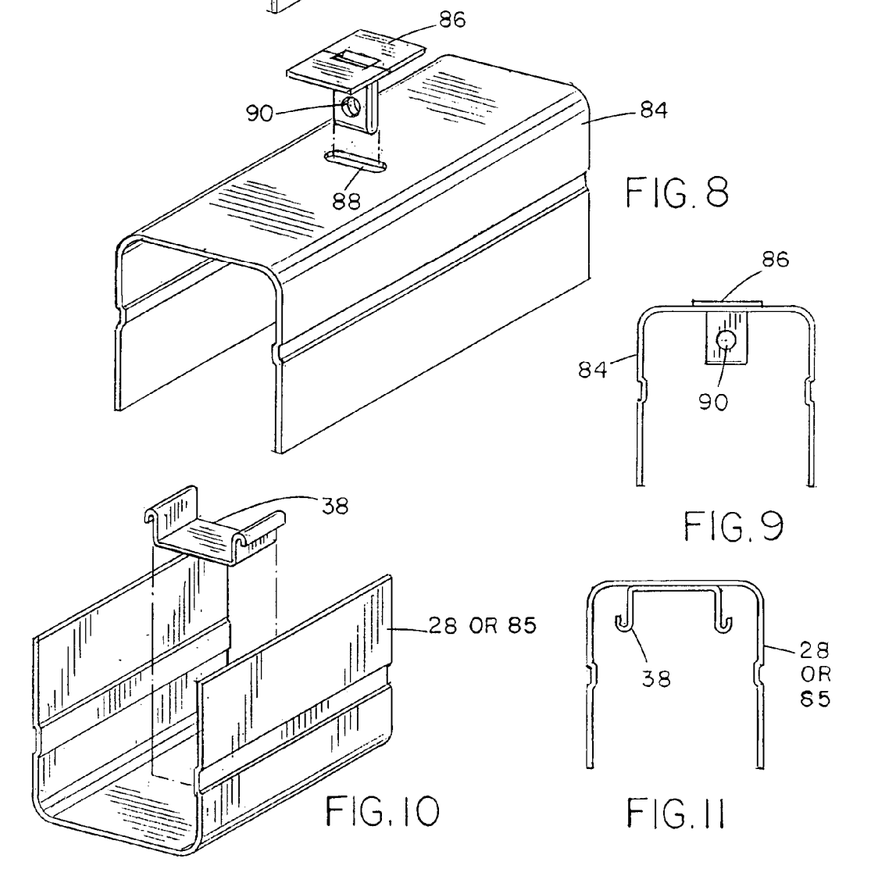
FIG. 8 is a perspective view of a lock connector.
FIG. 9 is an end view of the lock connector of FIG. 8 with the locking tab secured in place.
FIG. 10 is a perspective view of a snap-in connector.
FIG. 11 is an end view of the connector or FIG. 10 with the snap spring secured in place.
Figure 16:
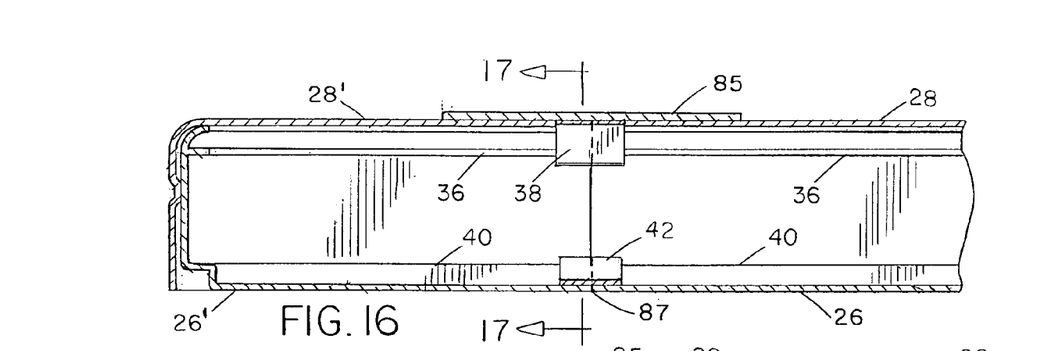
FIG. 16 is an enlarged sectional view taken on line 16—16 of FIG. 1.
Figure 17:
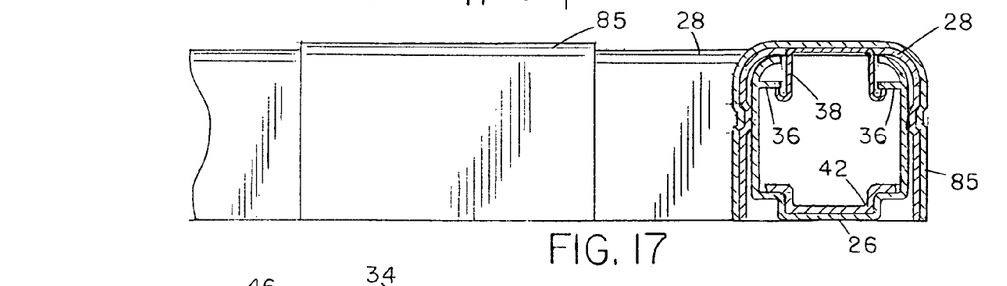
FIG. 17 is an enlarged sectional view taken on line 17—17 of FIG. 16.

To start assembly of a secure conduit system 2 a flange connector 8 is first inserted into a secure enclosure 6 and fastened tightly as described above. One end of a first raceway 26 is inserted fully into the connector tube 22, butting up against the portion of flange 20 which surrounds aperture 24. In the embodiment illustrated in FIG. 3, a top cover 28 is then fitted over the raceway 26. This top cover 28 will have an aperture 88 in it as illustrated in FIG. 8, for cooperation with the locking device 52 as will be described below. Connector tube 22 will be sized to accommodate both raceway 26 and top cover 28, so that the leading end of top cover 28 will have its end also abut flange 22 and the entire combination of the raceway 26 and the top cover 28 fill the interior of connector tube 22. At least for the first section of the conduit, the top cover 28 is preferably longer than the raceway 26 so that when the second raceway 26 is attached to the first raceway 26, the first top cover 28 will extend over the exposed end of the first raceway 26 for a short distance to cover the joint between the two raceway elements. A gap bridge 42 will join the two raceways. Thereafter the second raceway 26 is capped with a top cover 28 which does not have an aperture 88. A locking tab 38 may be positioned in the second top cover 28, as shown in FIGS. 10 and 11, to engage the ribs 36 in the second raceway 26 to secure the second top cover 28. Alternatively, if desired the structure of FIGS. 10 and 11 may be a supplemental cover 85 which can be slip fitted to overlay two abutting top covers 28 and 28' and extend into abutting raceways 26 and 26' to lock the raceways and top covers together through engagement of the tab 38 and thus block penetration or separation of the abutment joint 87, as illustrated in FIGS. 16 and 17. It will be seen that conduits of any desired length can be constructed in this manner by sequential assembly of additional raceways 26 and top covers 28, as desired, either joined directly by tabs 38 or indirectly by supplemental covers 85.

Figure 18:
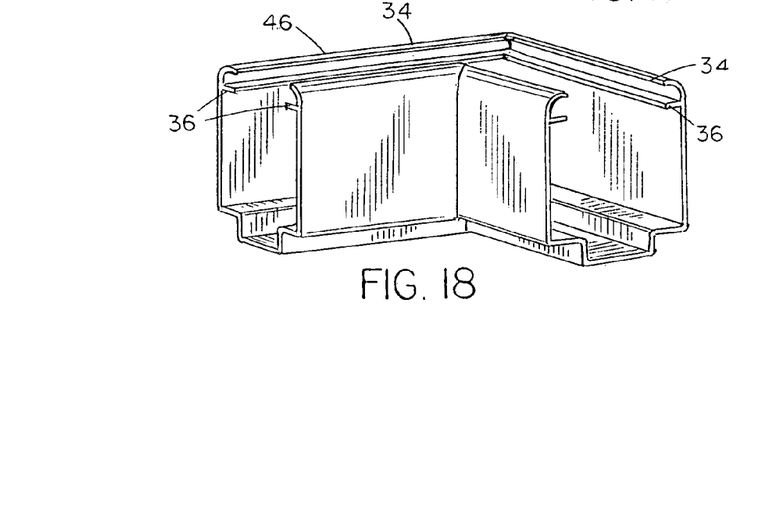
FIG. 18 is a perspective view of a corner raceway component.
Figure 19:
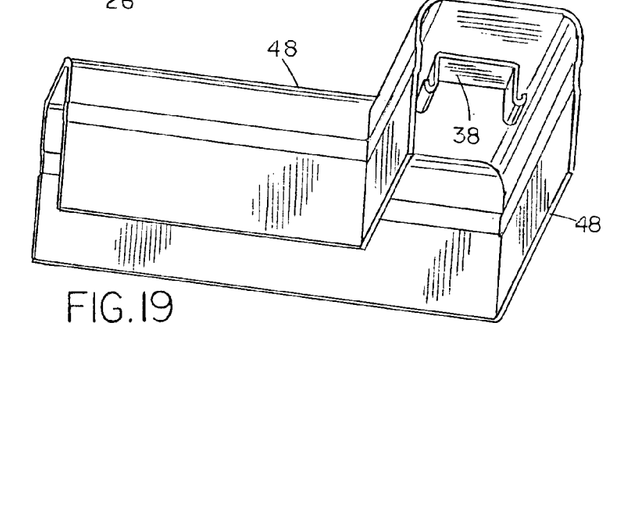
FIG. 19 is a perspective view from below of a corner top cover.
Figure 20:
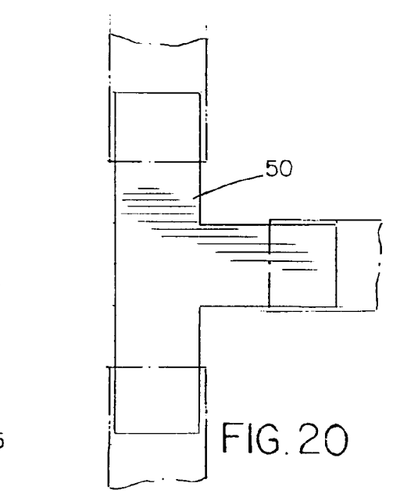
FIG. 20 is a top view of a T-shaped junction unit.
Figure 29:
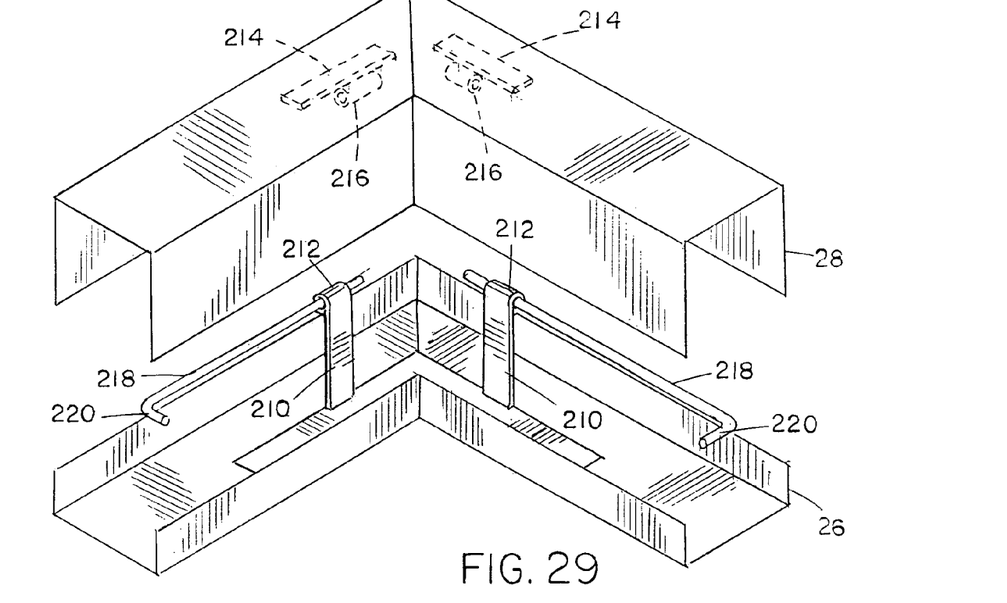
Figure 30:
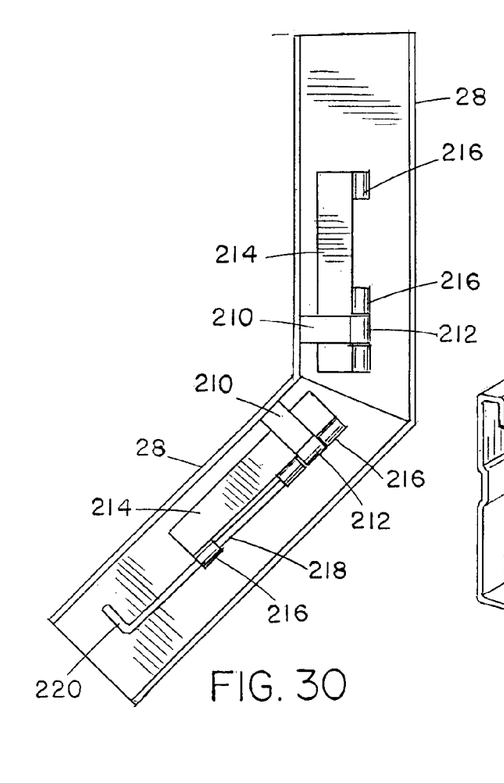
FIG. 30 is a plan view from below of the interior of an L-shaped bend unit, similar to the L-shaped corner unit of FIG. 29.

L-shaped corner or bend raceways 46 (FIG. 18) their top covers 48 (FIG. 19) and corresponding T-, Y- and X-shaped or other multi-armed branching junction raceway units and their corresponding top covers (generally indicated at 50; FIG. 20) may be incorporated as needed to construct the desired overall system configuration. Some corners and other units may have the raceways and covers secured together by the locking mechanisms described herein which incorporate internal and external elements as illustrated, e.g., in FIGS. 3 and 16. However, particularly preferred configurations of such units with internal locking mechanisms are illustrated in FIGS. 27–30. In these preferred configurations the raceway 26 has secured to the middle portion thereto (as by spot welding or strong adhesive) an upwardly extending bar 210 terminated by a barrel 212 disposed parallel to the inner top surface of the top cover 28. The inner top surface of the cover 28 has a corresponding latching member 214 which is configured as one half of a hinge, with knuckles 216 serving as guides for a sliding pin 218 (similar to a hinge pin) with a hooked end 220 to allow for manipulation of the pin 218. In one mode of operation when the raceway 26 and the cover 28 are interfitted, the barrel 212 fits between two of the knuckles 216a and 216b with their respective axes aligned, and the pin 218 can be manually moved from within the interior of the interfitted raceway/cover to a position where it is extended through the barrel 212 and at least the knuckles 216a and 216b in the manner of a hinge pin to lock the raceway 26 and the cover 28 together. While the T-, Y- and X-configured units can operate with only one bar 210/member 214 pair, the L-shaped corners or bends (elbows) will normally require two pairs, one in each leg of the L, unless the L is very shallow (i.e., the bend or elbow encompasses only a small angle). Of course one can put additional pairs in two or more arms of the T-, Y- and X-shaped units as well if desire, to enhance their resistance to unauthorized access. One may also support the pin 218 within the barrel 212 and have it slide into one or more of the knuckles 216 as illustrated in FIGS. 29 and 30. Other convenient configurations will be evident to those skilled in the art depending on the specific alignments of adjacent parts of the conduit bend, elbow, junction, etc. It will also be evident that once locked together in this manner, the raceway and cover can only be unlocked for separation from within the conduit, thus providing another element of securement and prevention of unauthorized access for the present system.

The system requires that at least one location a closed top cover will not be used. Rather at this location a locking top cover (described below) will be inserted once the insertion of the cabling is completed and the closed top covers have been placed. In the preferred assembly procedure, at least for a portion of the system the raceways 26 are first placed, including any corner or junction raceways in that portion. Preferably this section will be one which connects to a secure enclosure. The cabling is then laid into the raceways 26 through the openings 30 in their tops and the ends of the cabled passed into the interior of the enclosure. This installation of cabling by simply laying them in the raceways will be recognized to be much easier than having to thread or fish the cables through closed conduits. It may also be desired to lay the cabling throughout the entire conduit system at this time, instead of laying the cabling only for one portion of the system at a time, particularly if the system is fairly short (as for instance within a single room, a suite of rooms or a small building). Once the cables are placed, the top covers 28 can be installed, awaiting the installation of the locking mechanisms to be described below. Where there may be prior non-secure raceways of different cross-section used in the system, one can use raceway covers with modified snap-in connectors configured to connect to the upper parts of those raceways and provide the needed security.

Figure 12:
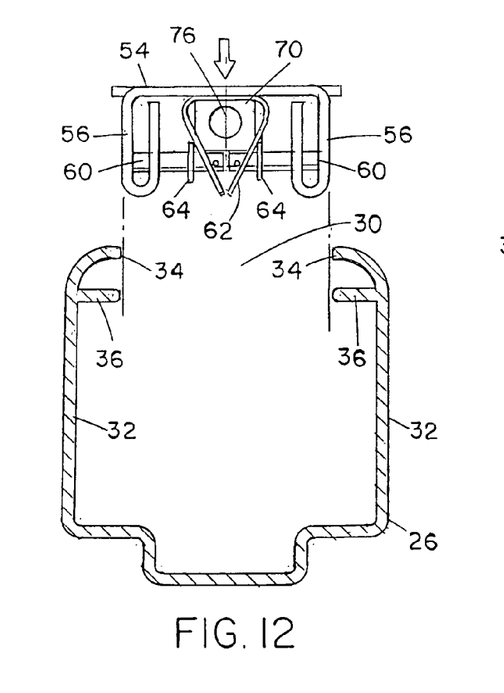
FIG. 12 is an enlarged sectional view taken on line 12—12 of FIG. 6 showing the initial insertion of a locking unit.

A critical element of the present invention is the securing locking mechanism used to maintain the integrity of the conduit system while permitting its simple and easy unlocking and disassembly when desired, while yet insuring that the locking system cannot be unlocked or disabled by unauthorized means. This is accomplished by means of locking plate assemblies inserted at the gaps in the top cover installations along the conduit. The top cover mechanism and its installation and operation is best illustrated in FIGS. 3–5, 8–9 and 12–14. One embodiment of the locking device 52 is shown from above and below in FIGS. 4 and 5, respectively. (Other embodiments will be exemplified below.) It comprises a base plate 54 which has a lateral width W slightly greater than the width of the opening 30 in the raceway 26. The plate 54 also has an aperture 68 and guides 70 (conveniently formed by bending inwardly two tabs formed by cutting aperture 66) in which a longitudinally extending rod 72 is mounted through holes 76. Aperture 68 is positioned such that retracting rod 72 clears its distal end 84 from being beneath aperture 68. Rod 72 has a flange 74 serving as a stop and a hole 78 near one end to which is attached a pull wire 80. A compression spring 82 surrounds the rod 72 and its end distal from the hole 78 is attached to the rod 72. The spring 82 should be of a strength such that when released from compression it readily urges the rod 72 into a locked position as described below, but not so strong that an excessive pull on pull wire 80 must be used to retract it and release locking top cover 84 when access to the interior of the conduit system is desired. Depending from the corners of the plate 54 are U-shaped support brackets 56 with apertures 58 therethrough to guide and support locking pins 60. Wedged between the pair of support brackets 56 at each end of the plate 54 is a spring metal strip 62, preferably made of spring steel. Prior to insertion into the conduit, the strips 62 are compressed inwardly as shown in FIG. 12 and held in that position by pliers handled by the installer. The strips 62 are positioned inwardly of and in contact with flanges 64 on the pins 60. (Other embodiments of securing means will be exemplified below.)

Figure 13:
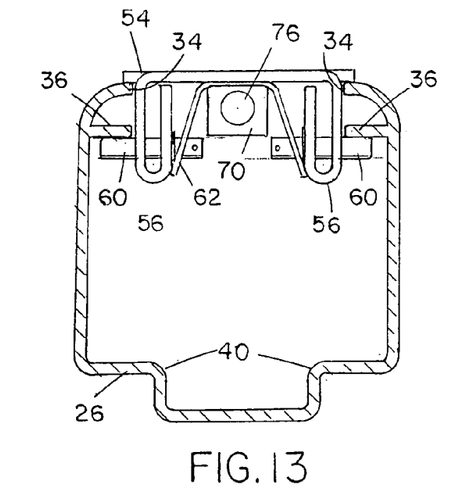
FIG. 13 is a view similar to FIG. 12 showing the locking unit secured in place.
Figure 14:
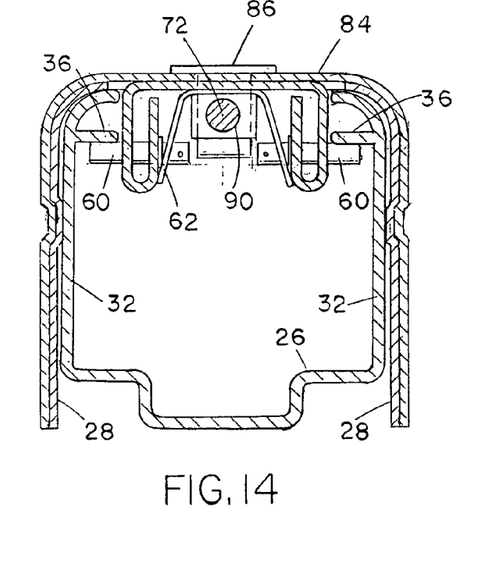
FIG. 14 is an enlarged sectional view taken on line 14—14 of FIG. 3.
Figure 15:
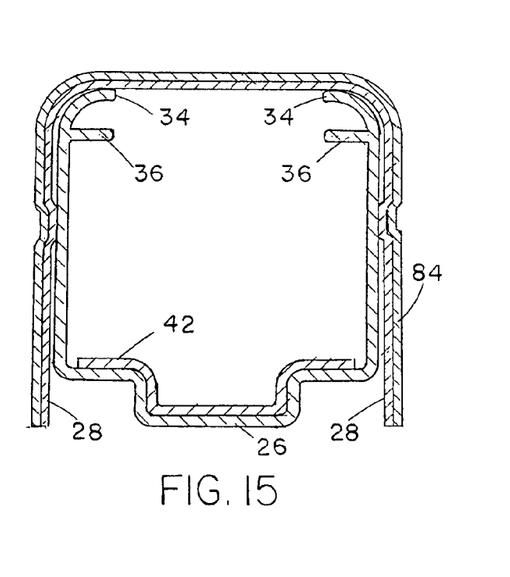
FIG. 15 is an enlarged sectional view taken on line 15—15 of FIG. 3.

The assembly procedure then continued with the installer lowering locking device 52 into an opening 30 in the space left between two closed top covers 30 (FIG. 12) until the base plate 54 rests on the top flanges 34 of the raceway (FIG. 13). The holes 58 in the brackets 56 are now disposed below the ribs 36. The installer then releases the spring metal strips 62 which spring outward in contact with the pin flanges 64, thus moving the pins 60 outwardly and under the ribs 36, thus securing the locking device 52 in place. Pull wire 80 is extended so that it extends to and through aperture 24 in the side of enclosure 6, where it terminates in pull ring 92. Then a locking top cover 84 (FIG. 8) is placed over the opening 30 and the locking device 52, so that the ends of the locking top cover 84 overlap onto the ends of the two adjacent closed top covers 28 as shown in FIG. 3, so that the entire length of openings 30 in the raceways 26 is now covered. The locking top cover 84 is placed so that its aperture 88 is aligned with aperture 68 in base plate 54, rod 72 is retracted by an installer pulling on pull ring 92 from within the secure enclosure 6, and a T-shaped locking bracket 86 is inserted through apertures 68 and 88 so that the leg of the bracket 86 with hole 90 projects into the interior of the raceway 26 and hole 90 is aligned with the distal end 74 of rod 72 (FIG. 3). The pull ring 92 is then released and, impelled by compression spring 82, rod 72 is urged forward and its distal end 74 passes through hole 90 in bracket 86, thus locking bracket 86 from upward movement and securing locking top cover 84 in place. All components of the secure conduit system 2 are now interlocked into position with each other and none can be moved or removed until rod 82 is again retracted from hole 90 in bracket 86 by manipulation of the pull ring 92 from within the secure enclosure. With all of the locking plate assemblies in place and their covers locked to them, the conduit assembly is complete.

Figures 21, 22, 23:
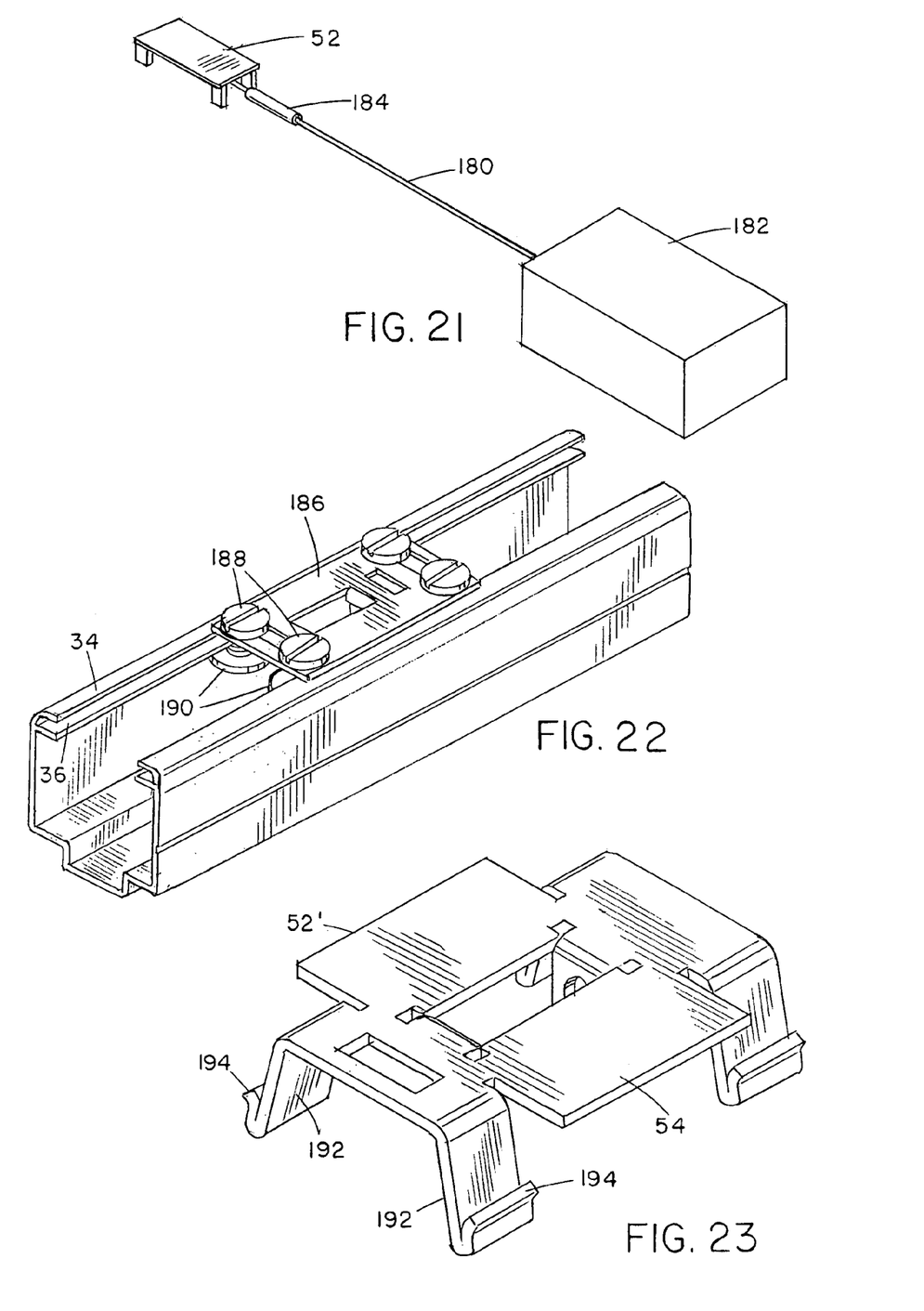
FIG. 21 is a schematic view from above of a mechanized system for locking and unlocking the locking unit.
FIG. 22 is a perspective view from above of yet another alternative version of the locking unit of FIG. 4 illustrating a different structure for securing the locking unit in place.
FIG. 23 is a perspective view from above of an alternative version of the locking unit of FIG. 4.

Alternative structures are contemplated for the locking device 52 and for manipulation of the locking and unlocking mechanism. FIG. 21 illustrates mechanized variations of the pull wire 80 and manual pull ring 92. The housing 182 is contemplated to contain a conventional mechanical or electromechanical actuator, (not shown) such as a servo mechanism, that will reciprocate a linkage 180 (in this case in the form of a rod) which causes the rod 72 to engage or disengage the bracket 86 as described above. Alternatively within the housing 182 could be a pneumatic or hydraulic actuator cooperating with linkage 180 (in this case in the form of a fluid-filled tube, which acts through a pressure-to-mechanical coupler 184 to engage or disengage the bracket 86 as described. Housing 182 will also contain means, preferably activatable from outside the housing, to start the actuator. The source of electrical, pneumatic or hydraulic power to move the actuator may be internal or external to the housing but should be internal to the secure enclosure 6. Batteries or pressurized reservoirs of gas or liquid may be maintained within the enclosure 6. If the source of the electricity, gas or liquid is outside the enclosure 6, then it must be provided access to the enclosure 6 in a secure manner consistent with the overall security of the enclosure and the conduit system.

Figures 24, 25, 26:
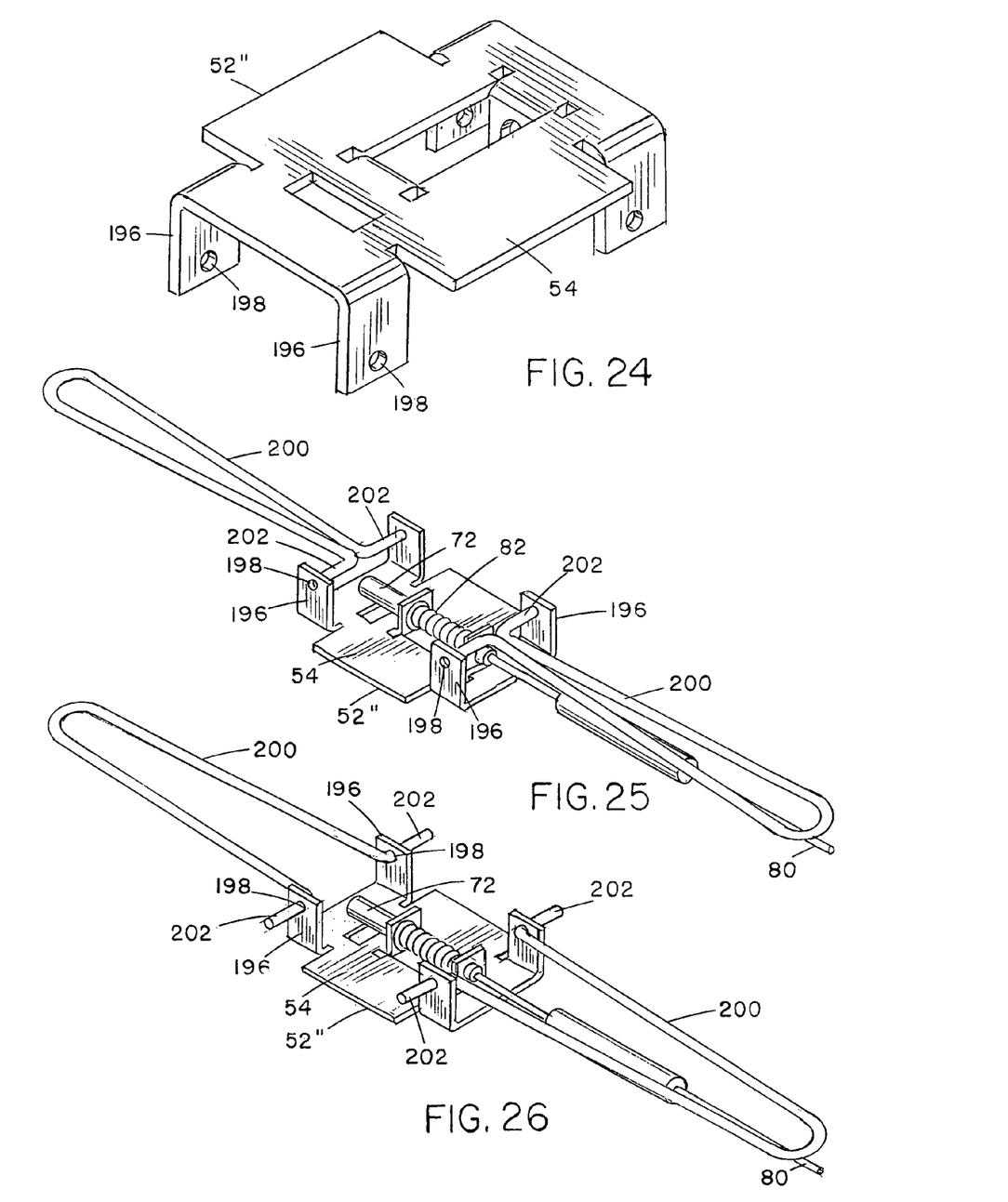
FIG. 24 is a perspective view of above of another alternative version of the locking unit of FIG. 4.
FIGS. 25 and 26 are respectively perspective views from below of the locking unit of FIG. 22 in cooperation with spring pins in an unlocked and locked configuration.
Figure 27:
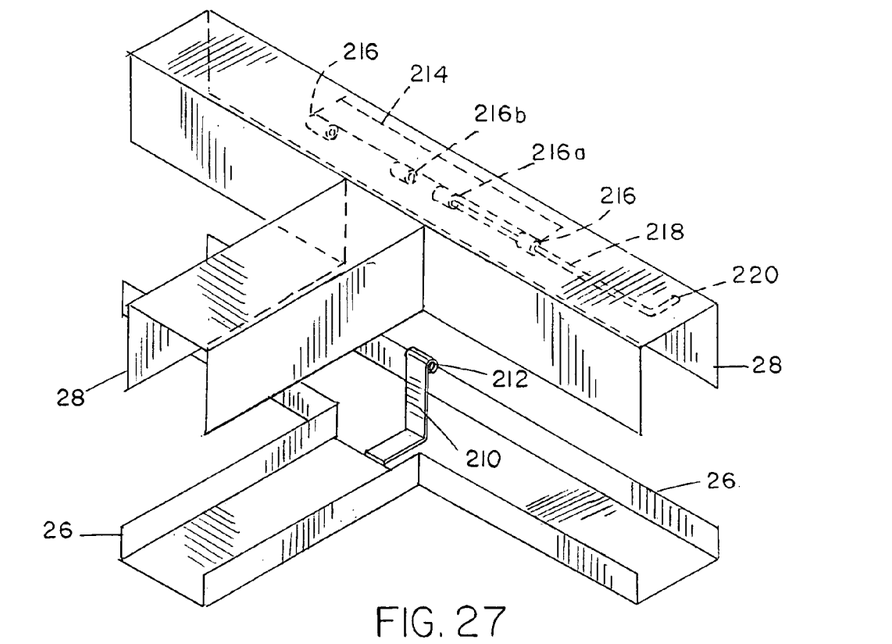
FIGS. 27, 28 and 29 are perspective separated views of the two halves of respectively a T-shaped locking junction unit, an X-shaped locking junction unit and an L-shaped locking corner unit.
Figure 28:
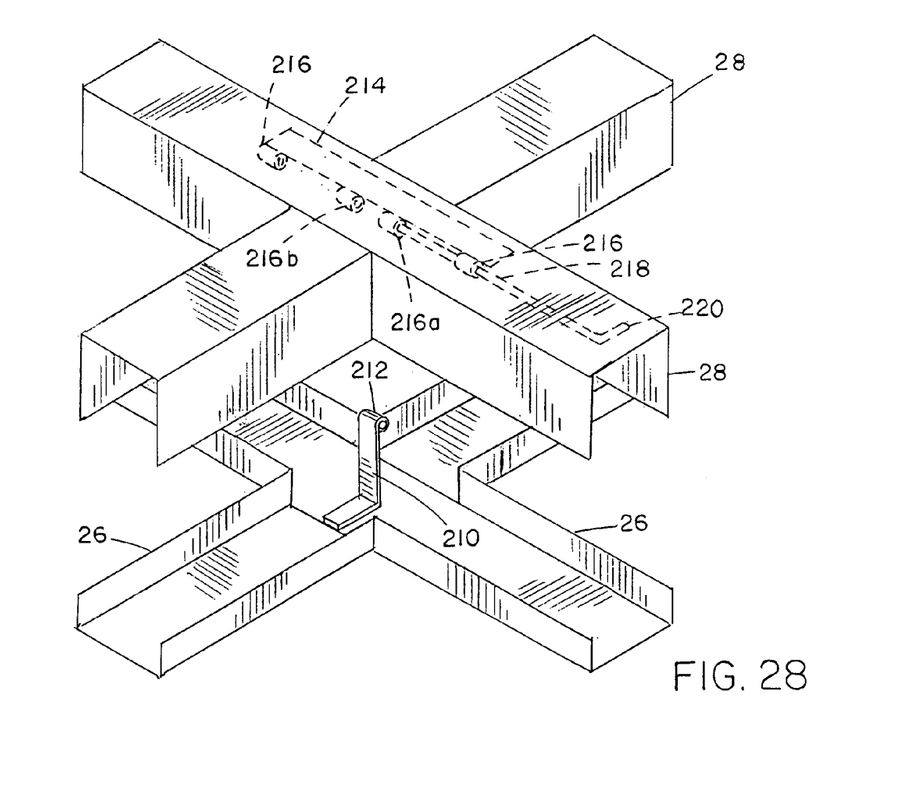

Further, the locking device 52 may alternatively be mounted as shown for comparable device 186 in FIG. 22, with the device 186 having a flat configuration with mounting bolts 188 the ends of which engage respectively flanges 34 and ribs 36 and which are thereafter tightened to secure the device 186 in place. In a further alternative illustrated in FIG. 23, the locking device 52 (here identified as 52') has slanted legs 192 projecting downwardly from the base plate 54 and terminating in hooked portions 194. When the device 52' is inserted into the opening 30 of raceway 26, the base plate 54 is seated against the top of raceway 26 as described above. However, in this embodiment the legs 192, which are slightly flexible, are forced into contact with the ribs 36 and each projecting hooked portion 194 flexes to slide below the underside of a rib 36 and then resiles to snap outwardly into locking engagement with the underside of the rib 34, thus securing the device 52' in place without the need for cooperating pins 60 or springs 62. In another alternative shown in FIGS. 24–26, device 52 (identified as 52") has rigid straight legs 196 with holes 198. When the bracket 52" is seated on the raceway 26, the legs 196 project through the opening 30 and the holes 198 are aligned with the underside of ribs 34. Spring pins 200, which are generally U-shaped devices with angled pin projection 202 are the ends of the legs of the U-shape, are then flexed closed (as illustrated in FIG. 25) and positioned manually to align the ends of projections 202 with the holes 198. Each spring pin 200 is then allowed to resile open allowing the projections 202 to pass through the holes 198 (as illustrated in FIG. 26) and engage the undersides of ribs 34 and lock the device 52" in place. This configuration can be readily unlocked by manually compressing the spring pins 200 to withdraw the projections 202 from the holes 198, thus releasing the locking device 52".

It will therefore be seen that this system is entirely secure from outside access or penetration, since it cannot be unlocked other than by release from within the secure enclosure, and the secure enclosure itself can be opened only by authorized persons. There are no external points of entry where an intruder can gain access. All covers are locked to the raceways either the snap-in connectors or by the locking plate assemblies. Any attempt to enter the secure enclosure or the secure conduit is visible to observers, particularly on those segments of the system where the raceways are mounted on standoffs from the underlying supporting wall or other structure. If it is desired to reenter the conduit, as for instance to lay additional cables or pipes through the conduit, or gain access to a faulty cable or pipe, one can only initiate access through a secure enclosure. In a manually operated embodiment, a user will pull on one of the access cables attached to a locking rod in a locking plate assembly to retract the rod and coil spring, removing the rod from the aperture in the lock plate connector. That section of the raceway cover can now be lifted out, exposing the locking plate assembly. In one embodiment that in turn can be removed by compressing the bent springs so that the side pins are retracted from under the raceway internal ribs. The interior of the raceway is then entirely open and the cables, pipes, etc. within can readily be accessed. (The removal steps for removal of the released locking plate will depend on the structure of each embodiment of the locking plate, as will be evident to those skilled in the art from the descriptions of exemplary embodiments herein.)

In addition to the obvious security provided to the cables, pipes, etc., the present invention also eliminates the time-consuming, tedious and often quite difficult process of "fishing" a cable, wire, etc. through a secure conduit. One can now simply lay the cable, etc. directly into the open raceway and then securely close the raceway over it with the covers and locking devices. This advantage is particular notable for pipes and other relatively rigid tubes which cannot usually be fished without extreme difficulty, and often cannot be fished at all. Such rigid devices can now simply be laid into the conduits and readily accessed and removed when required.

The raceways, top covers and other portions of the system are normally all formed from metal, especially steel or heavy gauge aluminum. The spring metal plates will be a springy material, normally a spring steel. A pull wire for manual or mechanical operation may be metal wire or a strong ceramic fiber or glass fiber or polymeric strand material, or may be a rigid rod of metal or fiber. Ordinary cord such as cotton or organic fiber cord is preferably avoided because of its low strength and potential for deterioration. Where the release mechanism is pneumatically or hydraulically operated appropriate fluid tubing will be used. It is preferred that the locking devices be positioned relatively close to their adjacent secure enclosures 6 such that pull wires or fluid tubes may be kept to a reasonably short length (e.g., about 1–3 feet [30–100 cm]). This will facilitate operation of the release mechanisms and avoid problems such as kinking in the pull wire or tube. Also preferably the pull wire or tube should not extend around a bend in the system 2, especially a sharp bend, but if such is necessary it is useful to have a guide (not shown) at the interior of the bend to guide the wire or tube around the bend and minimize movement friction and to avoid creating sharp bends and perhaps kinks in the wire or tube.

It will be evident that there are numerous embodiments of the present invention which are not expressly described above but which are clearly within the scope and spirit of the present invention. Therefore, the above description is intended to be exemplary only, and the actual scope of the invention is to be determined from the appended claims.

We claim:

1. Apparatus for secure routing of a signalling or transmission means which comprises:
   a first open-sided open-ended elongated channel member through which said means is routed;
   a first cover for closure of an open side of said first channel member;
   said first channel member and said first cover in combination forming a hollow first conduit section;
   a locking device to lock said first cover to said first channel member, said locking device being releasable only from within said first channel member; and
   release means for releasing said locking device and accessible through an open end of said first channel member;
   whereby said hollow first conduit section can be disassembled only by release of said locking device by access through an open end of said conduit section.

2. Apparatus as in claim 1 further comprising a second channel member and a second cover which upon being joined together form a second hollow conduit section which may be abutted to an end of said first conduit section to form an elongated conduit, with locking together of said first channel member and said first cover also serves to lock together said second channel member and said second cover, such that said elongated conduit can be disassembled only by release of said locking device by access through said open end of said elongated conduit.

3. Apparatus as in claim 2 further comprising at least one end of said elongated conduit being seated in an aperture in an enclosure such that access to hollow interior of said conduit and to said release means is only through said enclosure.

4. Apparatus as in claim 2 further wherein said elongated conduit comprises a plurality of said second conduit sections with at least one said first conduit section, with interiors of all of said first and second conduit sections being accessible only through an end of said elongated conduit.

5. Apparatus as in claim 4 further comprising one said first conduit section with said locking device at or adjacent to each end of said elongated conduit, such that unlocking and disassembly of a first conduit section may be accomplished from any end of said conduit.

6. Apparatus as in claim 5 further comprising each said end of said elongated conduit being seated in an aperture in an enclosure such that access to hollow interior of said conduit and to said release means is only through said enclosure.

7. Apparatus as in claim 6 wherein each said end is seated in a different said enclosure.

8. Apparatus as in claim 7 wherein each said enclosure is itself a secure enclosure.

9. Apparatus as in claim 4 further comprising said plurality of said second sections being interspersed with at least one hollow routing section comprising a raceway and top cover, said routing section serving to alter the linear direction of said elongated conduit or to divide said elongated conduit into a plurality of branches.

10. Apparatus as in claim 1 wherein said signalling or transmission means comprises electrical or electronic cabling or wiring or fluid conveyance tubing.

11. Apparatus as in claim 10 wherein said cabling or wiring comprises wire or optical fiber cabling.

12. Apparatus as in claim 10 wherein said fluid conveyance tubing comprises gas or liquid pneumatic or hydraulic lines.

13. Apparatus for secure routing of signalling or transmission means between a first location and a second location, which comprises:
   an elongated conduit with an end at each of said first and second locations, comprising a plurality of interconnecting elongated hollow conduit sections, each conduit section comprising an interconnected raceway having an open side and cover closing said open side, said raceway and cover forming an open interior extending through said conduit and providing said routing of said signalling or transmission means through said conduit;
   at least a raceway of a first one of said conduit sections having an open side and said interconnected cover covering said open side and being releasable from said raceway, said cover having a first aperture therein;
   a locking device seated on an exterior of said open side of said raceway with a portion thereof projecting into said interior of said raceway and being secured thereto, and said locking device having a second aperture therein;
   a latching bracket releasably mounted on said cover with a portion thereof projecting through said first aperture in said cover and said second aperture in said locking device;

latching means within said conduit for releasably engaging said latching bracket and retaining said portion of said bracket in position projecting through said first and second apertures, thereby releasably securing said cover in place covering said open side of said raceway; and latch release means within said conduit and attached to said latching means and operable only through an end of said conduit, for releasing said latching means from engagement with said latching bracket such that said cover may be disengaged from said raceway member and access gained to said interior of said conduit;

whereby said interior of said conduit and any signalling or transmission means routed therethrough are accessible only through said open end of said conduit.

14. Apparatus as in claim 13 further comprising at least one other of said conduit sections not having said locking device therein, and which may be abutted to an end of said first conduit section to form said elongated conduit, with locking together of raceway and cover of said first conduit section also serves to lock together said raceway and cover of said other conduit section, such that said elongated conduit can be disassembled only by release of said locking device by access through said open end of said elongated conduit.

15. Apparatus as in claim 13 further comprising at least one end of said elongated conduit being seated in an aperture in an enclosure such that access to hollow interior of said conduit and to said release means is only through said enclosure.

16. Apparatus as in claim 13 further comprising one said first conduit section with said locking device at or adjacent to each end of said elongated conduit, such that unlocking and disassembly of a first conduit section may be accomplished from any end of said conduit.

17. Apparatus as in claim 16 further comprising each said end of said elongated conduit being seated in an aperture in an enclosure such that access to hollow interior of said conduit and to said release means is only through said enclosure.

18. Apparatus as in claim 17 wherein each said end is seated in a different said enclosure.

19. Apparatus as in claim 18 wherein each said enclosure is itself a secure enclosure.

20. Apparatus as in claim 14 further comprising said plurality of said other sections being interspersed with at least one hollow routing section comprising a raceway and top cover, said routing section serving to alter the linear direction of said elongated conduit or to divide said elongated conduit into a plurality of branches.

21. Apparatus as in claim 20 wherein said routing section comprises a conduit section having a T-, Y-, L- or X-shaped or other multibranched configuration.

22. Apparatus as in claim 21 wherein said routing section comprises a raceway and interfitting cover forming a hollow interior with a latching apparatus disposed therein and manually operable to releasably secure said raceway and cover together.

23. Apparatus as in claim 22 wherein said latching apparatus comprises interfitting pin receivers extending respectively from said raceway and said cover and secured together with a pin interfitting with said receivers.

24. Apparatus as in claim 13 wherein each said raceway and each said cover therefor are generally U-shaped in cross-section.

25. Apparatus as in claim 24 further comprising said cover closing said open side of said channel by being inverted and disposed over said raceway with respective parallel side walls overlapping, thereby forming a secure tubular member with each end thereof being open.

26. Apparatus as in claim 25 wherein raceway comprises parallel sides forming said U-shaped cross-section with each of said parallel sides having a longitudinal rib disposed on the inner surface thereof.

27. Apparatus as in claim 26 further comprising said locking device having projections extending into said interior of said conduit, said projections having securing means associated therewith engaging each said longitudinal rib on said parallel walls, thereby securing said locking device in place.

28. Apparatus as in claim 27 wherein said securing means comprises laterally retractably extending pins which engage the underside of said ribs.

29. Apparatus as in claim 28 wherein retraction of said pins permits disengagement of said locking device from said cover and raceway.

30. Apparatus as in claim 28 wherein said pins are urged into engagement with said underside of said ribs by spring means.

31. Apparatus as in claim 27 wherein said securing means comprises bolts which clamp said locking device to both a top surface of said conduit and to said ribs.

32. Apparatus as in claim 13 wherein said latching means is reversibly operable by an elongated strand extending from said latching means through said elongated conduit and exiting from an end thereof for manipulation through said enclosure.

33. Apparatus as in claim 32 wherein said latching means is manipulated manually or by mechanical, electromechanical, pneumatic or hydraulic means.

34. Apparatus as in claim 13 wherein said signalling or transmission means comprises electrical or electronic cabling or wiring or fluid conveyance tubing.

35. Apparatus as in claim 13 wherein said cabling or wiring comprises wire or optical fiber cabling.

36. Apparatus as in claim 13 wherein said fluid conveyance tubing comprises gas or liquid pneumatic or hydraulic lines.

\* \* \* \* \*